US010320642B2

United States Patent
Bifulco et al.

(10) Patent No.: US 10,320,642 B2
(45) Date of Patent: Jun. 11, 2019

(54) DYNAMIC TCP PROXY SELECTION FOR ACCELERATION OF SHORT NETWORK FLOWS

(71) Applicant: NEC Europe Ltd., Heidelberg (DE)

(72) Inventors: Roberto Bifulco, Heidelberg (DE); Tobias Jacobs, Mannheim (DE)

(73) Assignee: NEC CORPORATION, Tokyo (JP)

(*) Notice: Subject to any disclaimer, the term of this patent is extended or adjusted under 35 U.S.C. 154(b) by 307 days.

(21) Appl. No.: 15/468,416

(22) Filed: Mar. 24, 2017

(65) Prior Publication Data
US 2018/0278506 A1    Sep. 27, 2018

(51) Int. Cl.
| H04L 12/26 | (2006.01) |
| H04L 12/733 | (2013.01) |
| H04L 29/08 | (2006.01) |
| H04L 12/70 | (2013.01) |
| H04L 12/707 | (2013.01) |
| H04L 29/06 | (2006.01) |

(52) U.S. Cl.
CPC ........ *H04L 43/0864* (2013.01); *H04L 45/122* (2013.01); *H04L 45/24* (2013.01); *H04L 47/00* (2013.01); *H04L 69/14* (2013.01)

(58) Field of Classification Search
CPC ..... H04L 12/26; H04L 12/733; H04L 63/102; H04L 43/08; G06F 15/16; G06F 3/067
USPC .......................... 709/219, 224, 241; 370/255
See application file for complete search history.

(56) References Cited

U.S. PATENT DOCUMENTS

| 6,563,517 | B1* | 5/2003 | Bhagwat | ............ H04N 21/6377 |
| | | | | 715/735 |
| 8,549,135 | B1* | 10/2013 | Yazdani | .................. H04L 47/35 |
| | | | | 709/224 |
| 8,654,787 | B2* | 2/2014 | Barreto | .................... H04L 49/90 |
| | | | | 370/466 |
| 9,613,158 | B1* | 4/2017 | Lepeska | ................. H04L 67/104 |
| 2008/0062997 | A1* | 3/2008 | Nix | .................... H04L 29/12066 |
| | | | | 370/395.2 |
| 2012/0314608 | A1* | 12/2012 | Okuno | ................ H04L 67/2828 |
| | | | | 370/252 |

(Continued)

OTHER PUBLICATIONS

Sameer Ladiwala, et al., "Transparent TCP acceleration", Computer Communications, vol. 32, Dec. 2009, pp. 691-702.

(Continued)

*Primary Examiner* — Tesfay Yohannes
(74) *Attorney, Agent, or Firm* — Leydig, Voit & Mayer, Ltd.

(57) ABSTRACT

A method for transmitting, over a transport network, data belonging to a data flow includes creating a proxy network including a plurality of transport network proxies; defining a plurality of proxy pairs; defining a plurality of proxy pair links; determining, for each proxy pair link, a round trip time (RTT) of the respective proxy pair link; determining, using the determined RTTs of the plurality of proxy pair links, a list of one or more preferred paths for each proxy pair, each preferred path connecting, via one or more of the plurality of proxy pair links, one proxy of the respective proxy pair to the other proxy of the respective proxy pair; and transmitting, from an ingress proxy to an egress proxy, the data belonging to the data flow over a proxy pair path selected from the list of preferred proxy pair paths.

11 Claims, 5 Drawing Sheets

(56) References Cited

U.S. PATENT DOCUMENTS

| | | | | |
|---|---|---|---|---|
| 2014/0297811 A1* | 10/2014 | Stevens | ................... | H04L 65/60 |
| | | | | 709/219 |
| 2015/0117264 A1* | 4/2015 | Kuo | ........................ | H04L 45/22 |
| | | | | 370/255 |
| 2015/0172168 A1* | 6/2015 | Picconi | ............... | H04L 63/0421 |
| | | | | 709/241 |
| 2018/0278506 A1* | 9/2018 | Bifulco | ............... | H04L 43/0864 |

OTHER PUBLICATIONS

Yong Lui, et al., "Application Level Relay for High-Bandwidth Data Transport", Proceedings of the First Workshop on Networks for Grid Applications (GridNets), Sep. 19, 2004, pp. 1-21.

* cited by examiner

DYNAMIC TCP PROXY SELECTION FOR ACCELERATION OF SHORT NETWORK FLOWS

FIELD

The present invention relates to a system and method for dynamic transport control protocol (TCP) proxy selection to improve TCP performance and transport layer security (TLS).

BACKGROUND

Flow and congestion control algorithms of TCP are dependent on the round trip time (RTT) between the two parties involved in the communication (client and server). TCP adopts a "slow-start" to discover available bandwidth, forcing a sender to use a slower sending rate during the start-up phase of the connection. When a feedback from the other end-point arrives, i.e., after RTT, the sending rate is increased. When the available bandwidth is reached the slow-start ends. The feedback requirement causes the speed of convergence to the available bandwidth to vary with the RTT. Therefore, when the RTT is large, the time it takes for a TCP flow to take full advantage of the actual available bandwidth becomes large as well.

For example, assume a client downloads a 400 Kbit file from a server, over a 10 Mbit/s link, with 40 ms as round trip time. If the flow control algorithm converged to the 10 Mbit/s bandwidth instantaneously, then the file would be downloaded in 40 ms (400 Kbit/10 Mbit). However, the TCP's flow control algorithm slowly increases the connection speed depending on the received Acknowledgement messages during the connection. Assume that the server starts sending the file at 100 Kbit/s and linearly increments by 100 Kbit/s the sending rate until convergence, i.e., the maximum bandwidth, is reached. Considering that each increment happens after an Acknowledgment message is received, and that acknowledgments are sent only upon reception of data, then, the server performs an increment of the sending rate every 40 ms, i.e., every RTT. To send 400 Kbit under this assumption, the server would then take 3 RTT, sending the following amount of data at each transmission: 100 Kbit (transmission rate is 100 Kbit/s)+200 Kbit (transmission rate is 200 Kbit/s)+100 Kbit (transmission rate is 300 Kbit/s). Thus, in the previous case it would take 3 RTT=40 ms×3=120 ms to transfer the 400 Kbit, which corresponds to an average transfer rate of 3.3 Mbit/s. Consider now the case in which the transfer happens over a link with 20 ms as RTT. The server would still require 3 RTT to send the data, but, this time, it would take 3 RTT=20 ms×3=60 ms to transfer the 400 Kbit, which corresponds to an average transfer rate of 6.6 Mbit/s. An important observation is that lowering the RTT between the end-points of a TCP connection makes the flow control algorithm's convergence time smaller.

In most of the cases the RTT cannot be arbitrarily changed, in particular when it is mainly caused by the propagation delay (i.e., the time it takes for a signal to travel from a point to another point). However, dividing the end-to-end connection into a number of segments guarantees that each of the segments has a smaller RTT between the segments' endpoints than the RTT between the connection's end-points. Thus, if each segment end-point runs a TCP flow control algorithm independently from the other segments end-points, then, the convergence time for each segment is lower that the convergence time on the end-to-end path.

To achieve a segmented TCP connection, it is possible to adopt a variable number of TCP proxies on the end-to-end path of the connection. A similar solution has been presented by Ladiwala et al. (Sameer Ladiwala, Ramaswamy Ramaswamy, and Tilman Wolf, *Transparent TCP Acceleration*, Comput. Commun. 32, 4 (March 2009), 691-702), where network routers are enhanced with the option of executing a TCP proxy, thus, enabling the activation of on-path TCP proxies for a subset of the flows traversing the routers. Notice that in the case of Ladiwala et al., the proxies are completely transparent and the system relies on the routing system to steer the network flows through the correct set of routers (which work as TCP proxy).

A different approach is to use explicit TCP proxies. Here the set of proxy locations is not limited to the TCP routing paths, but at any location of the network TCP proxies can be set up and used to accelerate data transfers. Here for each data transfer the optimal path through the set of potential TCP proxies has to be computed. An example of such approach is presented by Liva et al. (Yong Liva, Yu Gua, Honggang Zhanga, Weibo Gongb and Don Towsleya, *Application Level Relay for High-Bandwidth Data Transport*, September 2004). In that work, the throughput of the path is considered to be the minimum among the throughputs on the individual segments. This assumption simplifies computation of optimal paths (which are then so-called widest paths), but it does not capture well the slow-start phase of TCP. During the slow-start phase—and the majority of TCP connections never leave the slow-start phase—the optimal path is not simply a shortest path or widest path, but is the solution of a bi-criteria optimization problem whose optimal solution depends on the actual size of the data to transfer. Thus, computing the optimal path for a TCP connection is a non-trivial task, but needs to be performed fast enough in order not to become another bottleneck for the data transfer.

SUMMARY

In an embodiment, the present invention provides a method for transmitting, over a transport network, data belonging to a data flow. The method includes creating a proxy network including a plurality of transport network proxies; defining a plurality of proxy pairs, each proxy pair including two of the plurality of transport network proxies; defining a plurality of proxy pair links, each of the plurality of proxy pair links connecting one proxy of a proxy pair to the other proxy of the proxy pair; determining, for each proxy pair link, a round trip time (RTT) of the respective proxy pair link; determining, using the determined RTTs of the plurality of proxy pair links, a list of one or more preferred paths for each proxy pair, each preferred path connecting, via one or more of the plurality of proxy pair links, one proxy of the respective proxy pair to the other proxy of the respective proxy pair; and transmitting, from an ingress proxy selected from the plurality of transport network proxies to an egress proxy selected from the plurality of the transport network proxies, the data belonging to the data flow over a proxy pair path selected from a list of preferred proxy pair paths for the proxy pair including the ingress proxy and the egress proxy. Each preferred path in the list of one or more preferred paths for a particular proxy pair includes a maximum link RTT and a total path RTT. For each pair of preferred paths for a particular proxy pair, one preferred path of the respective pair of preferred paths has a greater maximum link RTT and a lesser total path RTT as compared to the other preferred path of the respective pair of preferred paths. The proxy pair path is selected from the list of preferred proxy paths for the proxy pair including the ingress proxy and the egress proxy based on a flow size of the data flow.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
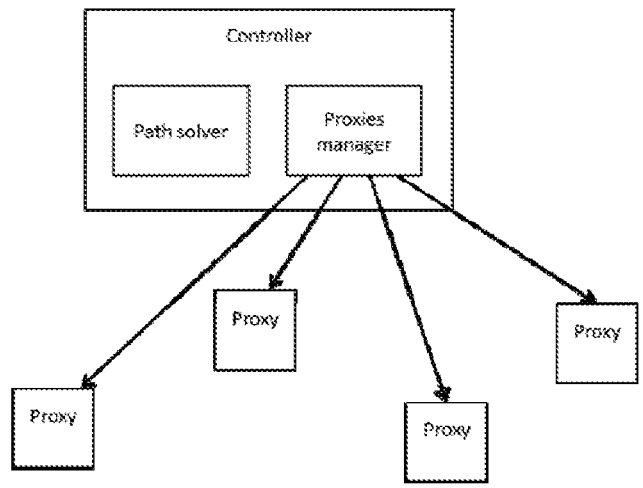
FIG. 1 is a block diagram depicting a schematic diagram of a system for managing TCP flows according to an embodiment of the invention.

In today's Internet, a large portion of data transfers use HTTP and TCP as transport protocols, with the majority of TCP flows having a size smaller than 100 kBs. The recent development and deployment of protocols such as SPDY and HTTP2 has the potential to change the amount of data transferred over each TCP connection. By multiplexing multiple HTTP requests over a single TCP connection, such protocols effectively enable the use of fewer TCP connections, consequently increasing the amount of data transferred per connection. Given the mechanics of TCP flow and congestion control algorithms, this shift in the distribution of flow sizes could produce significant inefficiencies in the data transfer.

Currently, there are a few solutions to address the issue. For instance, a possibility is to fine-tune the TCP flow control algorithm for the greater RTT. However this requires manual configurations, a careful selection of the parameters, while managing those parameters on a per-connection basis. Alternatively, Wide-Area-Network (WAN) optimizers can be deployed at the two ends of the communication. The optimizers use normal TCP with the client and the server, while using custom, WAN-optimized protocol configurations between them. This solution has the disadvantage of deploying specialized devices at both ends of the communication, requiring ad-hoc developed protocols between them.

Systems and methods are described herein for computing TCP proxy paths for individual data transfers, wherein the computing is fast enough to be applicable for increasing the speed of TCP connections that remain in the slow-start phase.

Systems and methods are described herein that use TCP proxies to accelerate TCP flows, and particularly, TCP flows of short duration.

Systems according to embodiments of the invention can have a central controller that performs two main roles: (1) managing the life-cycle of a set of proxies, and (2) selecting, for a given pair of end-points, a path through proxies that should be used. The central controller can be a processor, a processor core, or a plurality of processors and/or processor cores located at single location or distributed amongst multiple locations. Such processors and/or processor cores are configured to execute processor executable instructions for performing said main roles.

The first role can, according to embodiments of the invention, be performed by a component that can be referred to as a Proxies Manager. The Proxies Manager has the purpose of creating, monitoring, and destroying TCP proxies. The Proxies Manager can be a processor, a processor core, or a plurality of processors and/or processor cores located at single location or distributed amongst multiple locations. Such processors or processor cores of the Proxies Manager are configured to execute processor executable instructions for performing the creating, monitoring, and destroying TCP proxies. The Proxies Manager can leverage cloud datacenters to create proxies as virtual machines. The Proxies Manager can also use deployed proxies to gather information about a path distance of a connection between any pair of deployed proxies.

The second role can, according to embodiments of the invention, be performed by a component that can be referred to as a Path Solver. The Path Solver is responsible for computing a path through deployed proxies to connect a given pair of end-points. The Path Solver can be a processor, a processor core, or a plurality of processors and/or processor cores located at single location or distributed amongst multiple locations. Such processors or processor cores of the Path Solver are configured to execute processor executable instructions for computing, for a given pair of end-points, a preferred path through a network of deployed proxies.

Information gathered by the Proxies Manager about a path distance between any pair of deployed proxies, together with an available proxies list, is provided by the Proxies Manager to the Path Solver. The Path Solver uses the provided information to build a distance matrix. The Path Solver uses the distance matrix as an input for computing, for any pair of deployed proxies, a preferred path through a network of deployed proxies between the respective pair of deployed proxies. The Path Solver can create a set of preferred paths that should be used which includes, for each pair of deployed proxies, a preferred path through the network of deployed proxies. Once the Path Solver has created a set of preferred paths that should be used, the Path Solver can transmit the set of preferred paths that should be used to the Proxies Manager, and the Proxies Manager can transmit the set of preferred paths that should be used, or a portion thereof, to each of the deployed proxies. For example, the Proxies Manager can transmit only the portion of the set of preferred paths relevant to a particular deployed proxy to that particular deployed proxy. Each deployed proxy can then use the set of preferred paths relevant to it to look up a path to use for every new TCP connection The Proxies Manager can periodically send updates to the information about the path distance between pairs of deployed proxies, which can be periodically received by the Path Solver. The Path Solver can then re-compute the set of preferred paths that should be used. The updated set of preferred paths, or only relevant portions thereof, is then transmitted by the central controller to each of the deployed proxies. Each deployed proxy can then use the updated set of preferred paths relevant to it to look up a path to use for every new TCP connection.

During the establishment of a new TCP connection, a client is redirected to a first proxy that works as an entry point to the network of proxies. Possible redirection techniques include domain name system (DNS) redirection, IP anycast, URL rewriting, transparent on path proxy placement, etc. Once the client TCP connection has been directed to the first proxy, there are two possible scenarios. If the first proxy can read the final destination of the connection from the received network packets, e.g. the first proxy is deployed transparently, the first proxy will select a preferred path to use for such connection based on the final destination. Alternatively, if the first proxy cannot read the final destination of the connection from the received network packets, e.g. if the first proxy is explicitly addressed because of DNS redirection, the first proxy must complete establishment of the TCP connection and wait for the first application layer data to read the final destination of the connection (in such case, the information on the final destination of the TCP connection is only contained in the application layer header, e.g., HTTP). Then, once the final destination of the connection is determined, the first proxy can relay the TCP flow to a preferred path.

The first proxy can also estimate an amount of data to be transferred over the TCP connection in order to determine a preferred path to be used. In order to estimate the amount of data to be transferred over the TCP connection, the first proxy can, e.g., read a content length field in the application layer header, infer the probability of a given amount of data to be transferred based on historical data for connections to a given destination, and/or exchange information pertaining to the size of served content with the served final destination.

Assuming that a TCP data transfer is small enough not to leave the slow-start phase (which is valid for the majority of TCP connections), the time it takes to transfer the data between two endpoints S and T via a direct connection can be calculated as:

$$d \cdot RTT(S,T),$$

where d is a number of rounds of the slow-start phase. The number of rounds d depends on the amount of data to transfer. In each round, endpoint S sends a predefined number of packets and waits for an "Acknowledgement" message from endpoint T before starting a next round.

Where there are proxies between endpoint S and endpoint T, each such intermediate proxy P can forward the packets received during a round immediately to a next intermediate proxy Q. However, before sending packets of a subsequent round, intermediate proxy P must wait for an "Acknowledgement" message from intermediate proxy Q. Thus, intermediate proxy Q must wait for at least RTT(P,Q) between two consecutive rounds. Therefore, the time between the arrivals of packets at the final destination endpoint T from two consecutive rounds is the maximum RTT among all segments on the path.

The total time of a transfer, i.e. the time until the final packet has arrived at T, can be calculated as the time it takes to send a packet from S to T via the path of proxies (i.e. the time it takes for the first packets to arrive), plus (d−1) times the maximum round-trip time among all segments on the path (i.e. the time it takes the packets from the d−1 remaining rounds to arrive at T). Specifically, $$T = \tfrac{1}{2} \cdot (\text{total RTT}) + (d-1) \cdot (\text{maximum RTT}),$$

wherein T is the total time of the transfer.

As can be seen from the formula, the total time of the transfer is a linear combination of the total RTT and the maximum RTT on the path, and the coefficient of the maximum RTT term is dependent on the amount of data to transfer. Therefore, there may not be a single globally optimal path between endpoint S and endpoint T, but instead different optimal paths for different amounts of data to transfer.

For each particular transfer size, the cost (i.e. transfer time) of a given path through the network of proxies is a function of (a) the total round-trip time and (b) the maximum among the RTTs of the individual links. The cost is nondecreasing in both metrics. Thus the optimal path P* for a particular transfer must be Pareto-optimal in these two metrics, that is, any alternative path P' having a smaller total round-trip time than P* must have a larger maximum RTT, and any path P' having a smaller maximum RTT must have a larger total round-trip time.

The condition that the optimal path has to be Pareto-optimal is independent from the actual size of the data transfer. Therefore, for each pair of proxies, the complete set of Pareto-optimal paths (the so-called Pareto-front) between them can be computed. For any data transfer of a particular size, the best path can be selected from the pre-computed Pareto-front. For networks of several hundred proxies, the Pareto-front will, in practice, consist of only 10 or less different paths, and the look up of the optimal path will require only microseconds.

Systems and methods described herein employ a novel process for computing the Pareto-front for all pairs of deployed proxies for networks of several hundred deployed proxies in only a few seconds. The novel process for computing the Pareto-fron for all pairs of deployed proxies is necessary because the RTT between pairs of proxies changes frequently, e.g. every few minutes.

Systems and methods described herein employ a dynamic programming algorithm for computing the Pareto-front for all pairs of deployed proxies. The algorithm is based on the well-known Floyd-Warshall algorithm for computing the shortest paths between all node pairs in a network. Nevertheless, substantial modifications and improvements of this algorithm are necessary to make it compute the complete Pareto-front, while at the same time keeping the runtime fast enough for practical application.

Let 1 . . . m be the list of all links (i.e. proxy pairs) in the proxy graph, ordered by nondecreasing RTT. For i<m+1 let OPT(S,T,i) be the shortest path between S and T excluding links j+1, . . . , m. For each pair of proxies (S,T) the algorithm maintains an ordered list L(S,T) of Pareto-optimal paths, ordered by the longest round-trip time occurring on the path. For each pair of proxies (S,T) this list is initialized as being empty. To populate the lists, the algorithm proceeds in rounds 1, . . . , m. At the end of each round j, each list L(S,T) will contain all Pareto-optimal paths from S to T using only links 1, . . . , j.

In each particular round j, the algorithm computes OPT(S,T,j) for each proxy pair S and T and adds it to L(S,T) if it differs from the previously computed OPT(S,T,j−1). This computation is done efficiently as follows. Let j be the link from proxy A to proxy B. For each proxy S, the algorithm checks whether OPT(S,B,j) uses link j=(A,B). This can be checked by comparing OPT(S,B,j−1), which has been computed in the previous round, with the path OPT(S,A,j−1) concatenated with link j. If the latter has a shorter total RTT, then it means than OPT(S,B,j) uses link j. The algorithm puts a pointer to node S into an initially empty set set_AB. The algorithm additionally checks (analogously) whether OPT (S,A,j) uses link j. If yes, a pointer to S is put into an initially empty set set_BA. By optimality conditions it can never happen that a proxy S is both in set_AB and set_BA. Having done these two checks for each proxy S, the set set_AB contains all proxies whose minimum total RTT path (under the constraint of using only links 1 . . . j) to B is via link j=(A,B), while set_BA contains all proxies whose minimum total RTT path to A is via link j=(A,B).

For each pair of nodes (S,T) with S in set_AB and T in set_BA, the algorithm now checks whether the optimal path from S to T (using only links 1 . . . j) is actually using link j=(A,B). This can be done by comparing the previously computed path OPT(S,T,j−1) with the path obtained by concatenating OPT(S,A,j−1) with (A,B), and OPT(B,T,j−1). In case the latter path has a shorter RTT, it is added to the list L(S,T). Otherwise OPT(S,T,j) is identical to OPT(S,T, j−1) and nothing is added to L(S,T).

The reason why only proxy pairs S,T with S in set_AB and T in set_BA need to be considered is the observation that the shortest path from S to T can only use edge (A,B) if the shortest path from S to B is via (A,B), and the shortest path from A to T is also via (A,B). This observation restricts the proxy pairs to consider in each round to a small subset of all n2 proxy pairs (assuming n proxies), and thus the runtime of the algorithm is vastly reduced.

FIG. 1 is a block diagram depicting a schematic diagram of a system for managing TCP flows according to an embodiment of the invention. The system for managing TCP flows according to the embodiment depicted in FIG. 1 includes a Central Controller 100 and a plurality of deployed Proxies 150A-150D that together form a managed proxy overlay. The central controller includes a Path Solver 110 and a Proxies Manager 120. Each of the Central Controller 100, the Path Solver 110, and the Proxies Manager 120 can be, e.g., a processor, a processor core, or a plurality of processors or processor cores configured to execute processor executable instructions. Each of the plurality of deployed Proxies 150A-150D can be any network location that offers the possibility of running third party services in the form of a virtual machine or otherwise. Each deployed Proxy 150A-150D can be, e.g., any of a virtual machine located at a cloud datacenter, a Point-of-Presence (POP) of a virtualized carrier, an Internet Exchange Point (ISP), a mobile edge-computing infrastructure, etc. Each deployed Proxy 150A-150D can be any of an ingress proxy (InP), which is an entry point to the managed proxy overlay, an egress proxy (EgP), which is an exit point from the managed proxy overlay, a transport proxy (TrP), which is a proxy used to connect an InP to an EgP, and a lookup proxy (LoP), which is in charge of selecting a chain of proxies that should be used for a given destination and TCP flow.

Figure 2:
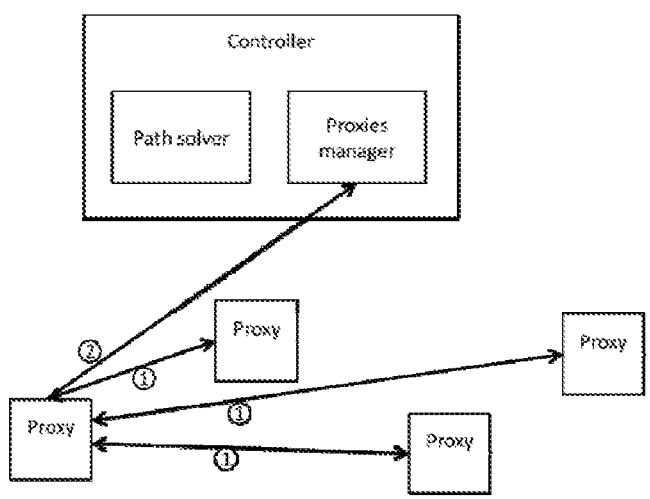
FIG. 2 is a block diagram depicting the system according to the embodiment of FIG. 1 executing a path distance information collection routine.

FIG. 2 is a block diagram depicting the system according to the embodiment of FIG. 1 executing a path distance information collection routine. In a first step (1), the Proxy 150A determines a path distance for a connection with each of the Proxies 150B-150D. In a second step (2), the Proxy 150A transmits the distance of a path to every other proxy in the managed proxy overlay. Each additional proxy in the managed proxy overlay will perform the same information collection routine such that the Proxies Manager 120 will receive, from each respective proxy in the managed proxy overlay, the distance of a path from that respective proxy to every other proxy in the managed proxy overlay.

The Proxies Manager 120 can maintain a proxy graph data structure, which can include an identity for every proxy in the managed proxy overlay and that can also include, for each proxy in the managed proxy overlay, fields pertaining to various attributes of each particular proxy. The proxy graph data structure can be stored at a non-transitory computer readable medium accessible by the Proxies Manager 120 or can be distributed among a plurality of non-transitory computer readable media accessible by the Proxies Manager 120. The proxy graph data structure can also include a list of links between each proxy in the managed proxy overlay, i.e. a list of all pairs of proxies in the managed proxy overlay. Alternatively, the list of all proxy pairs can be maintained at a separate proxy pairs data structure. Such a proxy pairs data structure can be stored at a non-transitory computer readable medium accessible by the Proxies Manager 120 or can be distributed among a plurality of non-transitory computer readable media accessible by the Proxies Manager 120. The proxy pairs data structure (or the proxy graph data structure if it stores a list of all proxy pairs in the managed proxy overlay) can store, for each proxy pair, a path distance, e.g. a RTT from one proxy of the proxy pair to the other proxy of the proxy pair. Alternatively or additionally, the Path Solver 110 can maintain such a proxy graph data structure and/or such a proxy pair data structure at a non-transitory computer readable medium accessible by the Path Solver 110 or distributed among a plurality of non-transitory computer readable media accessible by the Path Solver 110.

Figure 3:
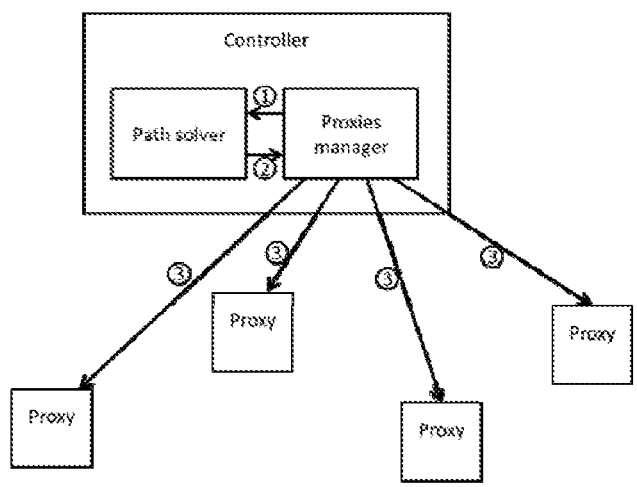
FIG. 3 is a block diagram depicting the system according to the embodiment of FIG. 1 executing a preferred path information dissemination routine.

FIG. 3 is a block diagram depicting the system according to the embodiment of FIG. 1 executing a preferred path information dissemination routine. In a first step (1) the Proxies Manager 120 transmits information pertaining to a path distance corresponding to every proxy pair of the managed proxy overlay to the Path Solver 110. Using the path distance information, the Path Solver 110 determines, for each proxy pair, a list of pareto optimal paths from one proxy of the proxy pair to the other proxy of the proxy pair. The Path Solver 110 can maintain a preferred path data structure, which can include, for each proxy pair in the managed proxy overlay, the list of pareto optimal paths from one proxy of the proxy pair to the other proxy of the proxy pair. The preferred path data structure can be stored at a non-transitory computer readable medium accessible by the Path Solver 110 or can be distributed among a plurality of non-transitory computer readable media accessible by the Path Solver 110. Alternatively or additionally, such a preferred path data structure can be maintained by the Proxies Manager 120 and stored at a non-transitory computer readable medium accessible by the Proxies Manager 120 or can be distributed among a plurality of non-transitory computer readable media accessible by the Proxies Manager 120.

In a second step (2), the Path Solver transmits the determined list of pareto optimal paths for each proxy pair to the Proxies Manager 120. In a third step (3), the Proxies Manager 120 transmits the determined list of pareto optimal paths for each proxy pair to each Proxy 150A-150D. The Proxies Manager 120 may transmit only the list of pareto optimal paths that begin at a particular proxy to that particular proxy. For example, the Proxies Manager 120 may transmit to the Proxy 150A only those pareto optimal paths that begin at the Proxy 150A.

Figure 4:
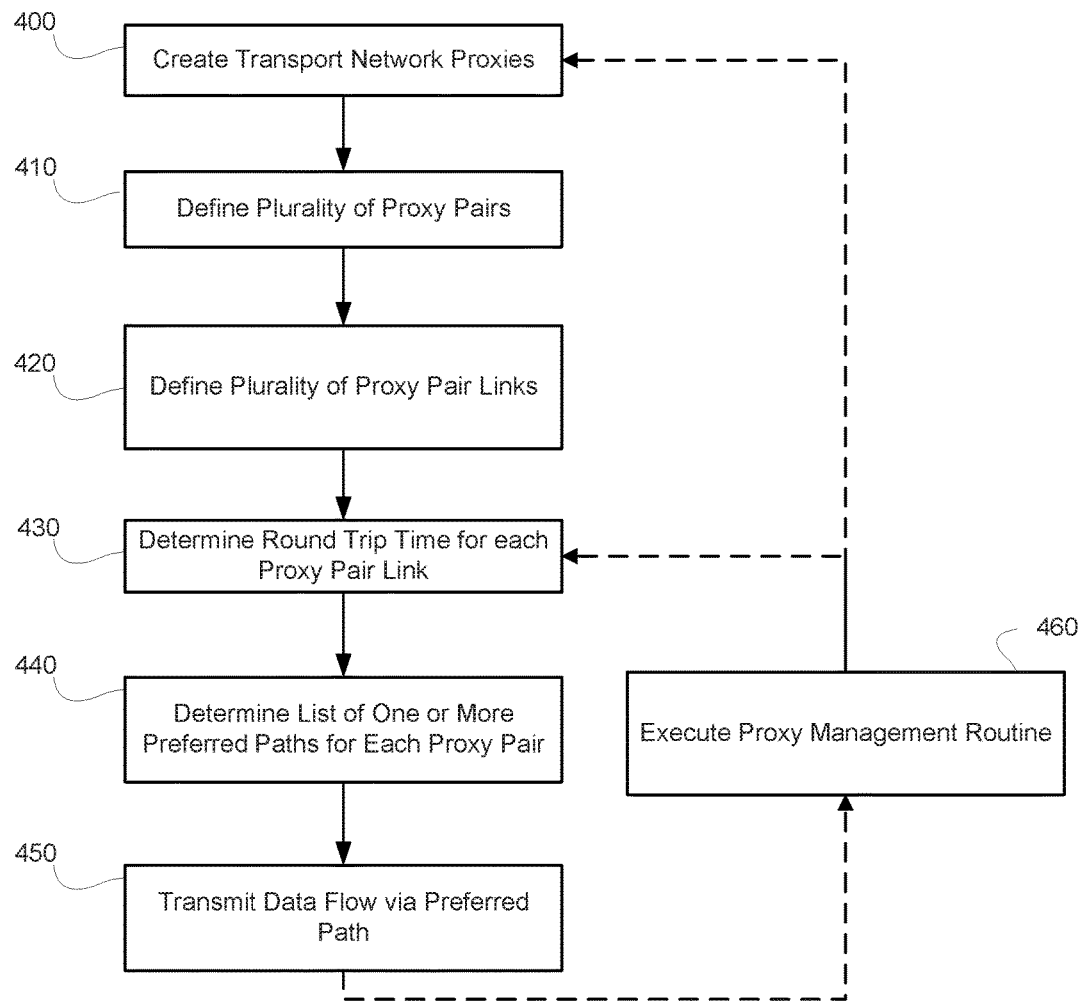
FIG. 4 is a flow chart depicting a process for managing TCP flows according to an embodiment of the invention.

FIG. 4 is a flow chart depicting a process for transmitting data belonging to a data flow over a transport network according to an embodiment of the invention. At 400, a plurality of transport network proxies are created. The plurality of proxies together form, with the central controller 100 of FIGS. 1-3, a managed proxy overlay. The plurality of proxies can be, according to an embodiment of the invention, TCP proxies. In an embodiment, the number of proxies created at 400 can be defined as n. However, additional proxies may be created that are not explicitly accounted for in determining preferred paths through the managed proxy overlay.

At 410, a plurality of proxy pairs are defined. Each of the plurality of proxy pairs includes two of the plurality of transport network proxies created at 400. Therefore, when the plurality of proxy pairs are determined from n proxies, the number of proxy pair defined at 410 is m=n(n−1). At 420, a plurality of proxy pair links are defined. Each of the plurality of proxy pair links connects one proxy of a proxy pair to another proxy of the proxy pair. The term link is used to refer to a direct connection from one of the plurality of transport network proxies to another of the plurality of transport network proxies without utilizing any of the other transport network proxies as an intermediary. When the number of proxy pairs defined at 410 is m=n(n−1), the number of proxy pair links is also equal to m.

At 430, a round trip time for each proxy pair link defined at 420 is determined. In order to determine the round trip time for each proxy pair link, each proxy created at 400 may periodically ping or otherwise establish a connection with each of the other proxies created at 400 in order to determine a round trip time or other measure of distance between itself and every other proxy. Upon determining the each link distance between itself and other proxies created at 400, a proxy may report the link distance to the central controller. Therefore, each of the n proxies may report (n−1) round trip times to the central controller.

At 440, a list of one or more preferred paths for each proxy pair defined at 410 is determined. Each preferred path connects one proxy of a proxy pair defined at 410 with the other proxy of that same proxy pair. Each preferred path includes one or more of the proxy pair links defined at 420. Each preferred path will have a total round trip time required to traverse the entire preferred path and a maximum link RTT, which is the maximum round trip time of an individual link included in the preferred path. The determination of the one or more preferred paths at 440 takes into account the round trip times for each proxy pair link defined at 420. For each of the proxy pairs defined at 410, multiple preferred paths can be determined at 440. However, for each of the multiple paths determined at 440 for a single proxy pair defined at 410, every other one of the multiple paths will have either a higher maximum round trip time for an included proxy pair link or a higher total path round trip time. In other words, for each pair of preferred paths for a particular proxy pair defined at 410, one preferred path of the respective pair of preferred paths will have a greater maximum link RTT and a lesser total path RTT as compared to the other preferred path of the respective pair of preferred paths.

At 450, data belonging to a data flow is transmitted from an ingress proxy (the ingress proxy being one of the proxies created at 400) to an egress proxy (the egress proxy being another of the proxies created at 400) via a preferred path determined at 440 for the proxy pair formed of the ingress proxy and the egress proxy. The preferred path used in transmitting the data flow is selected from the multiple preferred paths determined at 440 for the proxy pair formed of the ingress proxy and the egress proxy based on a flow size of the data flow. The flow size of the data flow may be an actual flow size of the data flow or an estimated flow size of the data flow. In order to estimate the size of the data flow, the ingress proxy can, e.g., read a content length field in the application layer header, infer the probability of a given amount of data to be transferred based on historical data for connections to a given destination, and/or exchange information pertaining to the size of served content with the served final destination. In determining which of the multiple preferred paths determined at 440 for the proxy pair formed of the ingress proxy and the egress proxy, the total time of a transfer can be determined or estimated for each of the plurality of preferred paths using the equation:

$$T = \tfrac{1}{2} \cdot (\text{total RTT}) + (d-1) \cdot (\text{maximum RTT}),$$

wherein T is the total time of the transfer and d is the number of rounds required to complete the transfer.

At an optional 460, the process determines that it is necessary to execute a proxy management routine. Executing the proxy management routine may include creating additional transport network proxies as well as monitoring and destroying transport network proxies previously created. The proxy management routine may additionally return the process to 410 where proxy pairs are redefined following the execution of the proxy management routine. The proxy management routine may also return the process to 430 where the round trip time for each proxy pair link can be updated.

Figure 5:
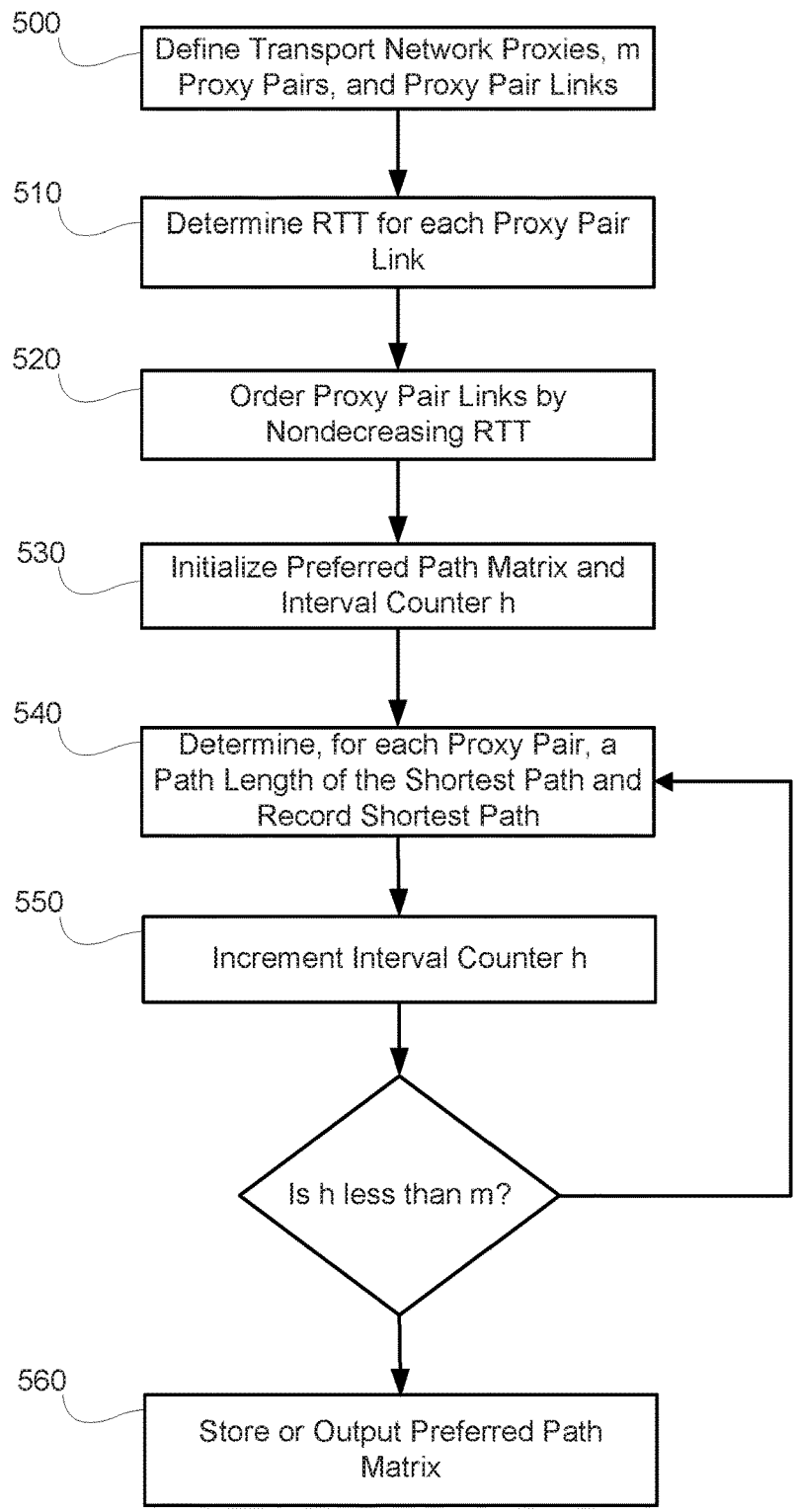
FIG. 5 describes a process for generating a preferred path matrix according to an embodiment of the invention.

FIG. 5 describes a process for generating a preferred path matrix that includes a list of one or more preferred paths for each proxy pair of a proxy network according to an embodiment of the invention. At 500, a number n of transport network proxies denoted $p_1, \ldots, p_n$, a number m=n(n−1) of proxy pairs denoted $(p_i, p_j)$ for $1 \le i, j \le n$, and the number m of proxy pair links denoted $l_1, \ldots, l_m$ are defined.

At 510, a RTT for each proxy pair link of the proxy pair links denoted $l_1, \ldots, l_m$ is determined. At 520, the proxy pair links denoted $l_1, \ldots, l_m$ are ordered in nondecreasing order of RTT such that $d(l_1) \le d(l_m)$, wherein $d(l_h)$ is the RTT of the proxy pair link $l_h$ for h=1, ..., m.

At 530, a preferred path matrix and an interval counter h are initialized. The interval counter h is initialized with the value 1. The preferred path matrix is initialized to include an array for each of the m=n(n−1) proxy pairs denoted $(p_i, p_j)$. Each of the arrays initially contains no values. At 540, the process determines, for each of the proxy pairs denoted $(p_i, p_j)$, a path length D(i,j,h) of the shortest path $L_{i,j,h}$ between proxies $p_i$ and $p_j$ excluding all links $l_{h+1}, \ldots, l_m$. It is possible that no path that excludes all links $l_{h+1}, \ldots, l_m$ and that connects the proxies $p_i$ and $p_j$ exists. Under such circumstances, the path length D(i,j,h) can be set equal to $\infty$ or to some other value indicating that no such path connecting proxies $p_i$ and $p_j$ exists that excludes all links $l_{h+1}, \ldots, l_m$. The shortest path $L_{i,j,h}$ between proxies $p_i$ and $p_j$ excluding all links $l_{h+1}, \ldots, l_m$ can be determined at 540 using the recursion:

$$D(i,j,h) = \min\{D(i,j,h-1), D(i,a_h,h-1)+d(l_h)+D(b_h,j,h-1), D(i,b_h,h-1)+d(l_h)+D(a_h,j,h-1)\},$$

where $l_h$ is the proxy pair link connecting the proxy pair $(a_h, b_h)$ and $d(l_h)$ is the RTT of the proxy pair link $l_h$. At 550, the interval counter h is incremented, and at 560, the value of the interval counter h is compared with the value m. If the value of the interval counter h is less than m, the process returns to 540. If the value of the interval counter h is not less than m, the process proceeds to 560 where the preferred path matrix is stored or output.

The preferred path matrix stored or output at 560 includes, for each proxy pair denoted $(p_i, p_j)$, an array having stored therein each of the pareto optimal paths from proxy $p_i$ to proxy $p_j$. The preferred path matrix can be stored at a non-transitory computer readable medium or distributed among a plurality of non-transitory computer readable media. For example, the preferred path matrix data structure stored or output at 560 can be, in an embodiment, stored at a non-transitory computer readable medium accessible by the Path Solver 110 and/or the Proxies Manager 120 of FIGS. 1-3 or can be distributed among a plurality of non-transitory computer readable media accessible by the Path Solver 110 and/or the Proxies Manager 120 of FIGS. 1-3.

Figure 6:
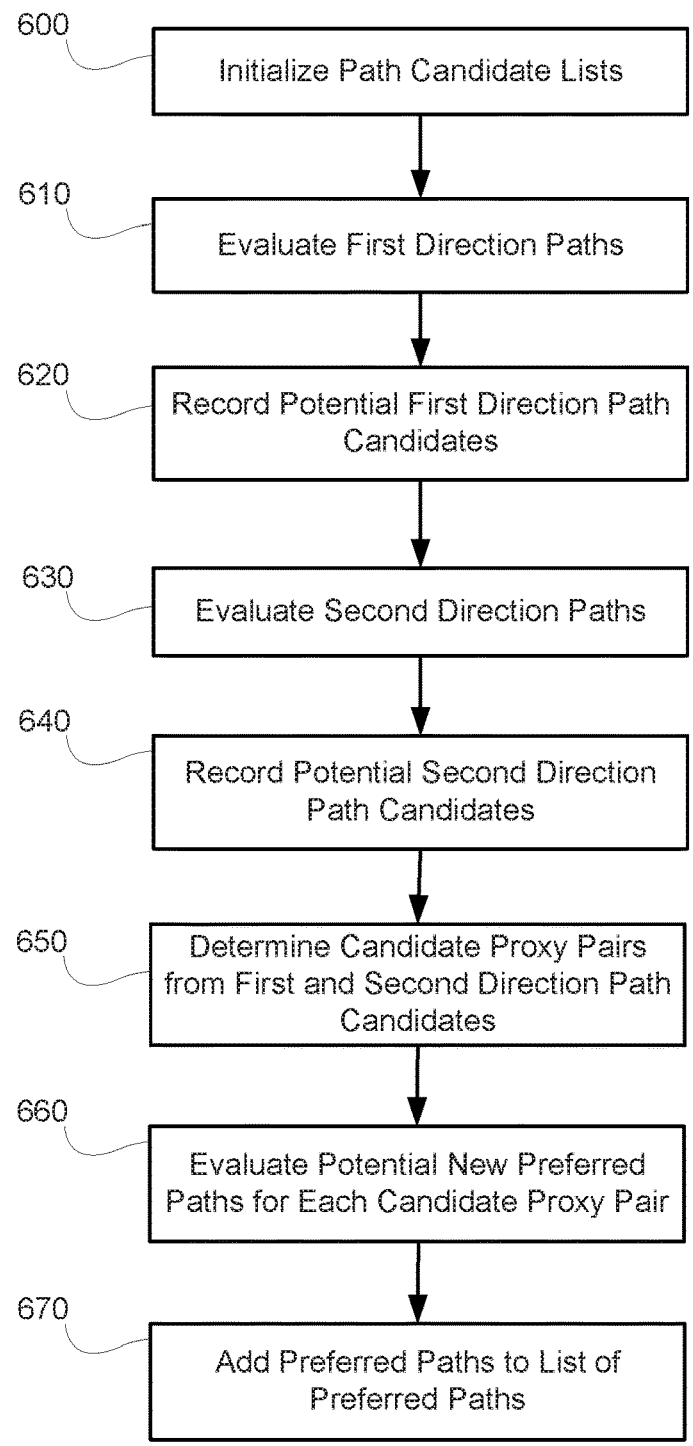
FIG. 6 describes a process for determining, for each proxy pair, a path length of the shortest path and recording the shortest path according to an embodiment of the invention.

In a preferred embodiment, the recursion at 540 can be computed efficiently by considering, at each iteration, only a subset of all possible paths. FIG. 6 describes a process for determining, for each proxy pair, a path length of the shortest path and recording the shortest path according to an embodiment of the invention. In particular, FIG. 6 describes a process for calculating the recursion:

$$D(i,j,h) = \min\{D(i,j,h-1), D(i,a_h,h-1)+d(l_h)+D(b_h,j,h-1), D(i,b_h,h-1)+d(l_h)+D(a_h,j,h-1)\},$$

used at 540. Specifically, the process described in FIG. 6 is a process that can be employed at each iteration of the process described in FIG. 5 (specifically, at 540) for determining, if any, a shortest path $L_{i,j,h}$ between proxies $p_i$ and $p_j$ excluding all links $l_{h+1}, \ldots, l_m$.

At 600, the process can create or initialize two path candidate lists, i.e. a→b and b→a. The two path candidate lists are data structures, e.g. arrays or matrices, that can be stored at a non-transitory computer readable medium. At 610, the process evaluates first direction paths. Specifically, the process compares a shortest path $L_{i,b,h-1}$ between proxies $p_i$ and $p_b$ excluding all links $l_h, \ldots, l_m$ with a shortest path $L_{i,a,h-1}$ between proxies $p_i$ and $p_a$ excluding all links $l_h, \ldots, l_m$ concatenated with the link $l_h$ that connects proxies $p_a$ and $p_b$. If no path that excludes all links $l_h, \ldots, l_m$ and connects the proxies $p_i$ and $p_b$ or that excludes all links $l_h, \ldots, l_m$ and connects the proxies $p_i$ and $p_a$ exists, the path lengths $D(i,b,h-1)$ of the shortest path $L_{i,b,h-1}$ and $D(i,a,h-1)$ of the shortest path $L_{i,a,h-1}$ can be set equal to ∞ or to some other value indicating that no such paths exist. If a path length $D(i,a,h-1)$ of the shortest path $L_{i,a,h-1}$ plus a path length $d(l_h)$ of the link $l_h$ is shorter than a path length $D(i,b,h-1)$ of the shortest path $L_{i,b,h-1}$, the process can determine that the shortest path $L_{i,b,h}$ includes the link $l_h$ and creates a pointer to i in a list a→b at 620. At 630, the process evaluates second direction paths. Specifically, the process compares a shortest path $L_{i,a,h-1}$ between proxies $p_i$ and $p_a$ excluding all links $l_h, \ldots, l_m$ with a shortest path $L_{i,b,h-1}$ between proxies $p_i$ and $p_a$ excluding all links $l_h, \ldots, l_m$ concatenated with the link $l_h$ that connects proxies $p_a$ and $p_b$. If a path length $D(i,b,h-1)$ of the shortest path $L_{i,b,h-1}$, plus a path length $d(l_h)$ of the link $l_h$ is shorter than a path length $D(i,a,h-1)$ of the shortest path $L_{i,a,h-1}$, determining that the shortest path $L_{i,b,h}$ includes the link $l_h$ and creating a pointer to i in a list b→a at 640.

At 650, the process determines candidate proxy pairs $(p_i, p_j)$ with i in the list a→b and j in the list b→a. Each candidate proxy pair $(p_i, p_j)$ with i in the list a→b and j in the list b→a is a potential candidate for having a preferred path that includes the link $l_h$ connecting proxies $p_a$ and $p_b$. At 660, the process evaluates potential new preferred paths for each candidate proxy pair. Specifically, the process compares, for each candidate proxy pair $(p_i, p_j)$ with i in the list a→b and j in the list b→a, a path length $D(i,j,h-1)$ of the shortest path $L_{i,j,h-1}$ between proxies $p_i$ and $p_j$ excluding all links $l_h, \ldots, l_m$ with a path length path length $D(i,a,h-1)+d(l_h)+D(b,j,h-1)$ of the shortest path $L_{i,a,h-1}$ between proxies $p_i$ and $p_a$ excluding all links $l_h, \ldots, l_m$ concatenated with the link $l_h$ connecting proxies $p_a$ and $p_b$ concatenated with the shortest path $L_{b,j,h-1}$ between proxies $p_b$ and $p_j$ excluding all links $l_h, \ldots, l_m$. If the path length path length $D(i,a,h-1)+d(l_h)+D(b,j,h-1)$ is less than $D(i,j,h-1)$, adding $L_{i,a,h-1}$ concatenated with $l_h$ concatenated with $L_{b,j,h-1}$ to a list of one or more preferred paths for the candidate proxy pair $(p_i, p_j)$ as $L_{i,j,h}$ at 670. For example, at 670 the process may add $L_{i,a,h-1}$ concatenated with $l_h$ concatenated with $L_{b,j,h-1}$ as $L_{i,j,h}$ to a preferred path matrix or to an alternative data structure including a list of entries to be added to the preferred path matrix at a subsequent point in time.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for transmitting, over a transport network, data belonging to a data flow, the method comprising:
    creating a proxy network including a plurality of transport network proxies;
    defining a plurality of proxy pairs, each proxy pair including two of the plurality of transport network proxies;
    defining a plurality of proxy pair links, each of the plurality of proxy pair links connecting one proxy of a proxy pair to the other proxy of the proxy pair;
    determining, for each proxy pair link, a round trip time (RTT) of the respective proxy pair link;
    determining, using the determined RTTs of the plurality of proxy pair links, a list of one or more preferred paths for each proxy pair, each preferred path connecting, via one or more of the plurality of proxy pair links, one proxy of the respective proxy pair to the other proxy of the respective proxy pair; and
    transmitting, from an ingress proxy selected from the plurality of transport network proxies to an egress proxy selected from the plurality of the transport network proxies, the data belonging to the data flow over a proxy pair path selected from a list of preferred proxy pair paths for the proxy pair including the ingress proxy and the egress proxy,
    wherein each preferred path in the list of one or more preferred paths for a particular proxy pair includes a maximum link RTT and a total path RTT, wherein for each pair of preferred paths for a particular proxy pair, one preferred path of the respective pair of preferred paths has a greater maximum link RTT and a lesser total path RTT as compared to the other preferred path of the respective pair of preferred paths, and wherein the proxy pair path is selected from the list of preferred proxy paths for the proxy pair including the ingress proxy and the egress proxy based on a flow size of the data flow, the flow size being determined based on one or more of a content length field in an application layer header, statistics generated from past connections to a destination, and information regarding content sizes served by a destination.

2. The method of claim 1, wherein the plurality of transport network proxies includes a number n of transport network proxies denoted $p_1, \ldots, p_n$, wherein the plurality of proxy pairs includes a number $m=n(n-1)$ of proxy pairs denoted $(p_i, p_j)$ for $1 \leq i, j \leq n$;

wherein the plurality of proxy pair links includes the number m of proxy pair links denoted $l_1, \ldots, l_m$, and wherein the determining, using the determined RTTs of the plurality of proxy pair links, a list of one or more preferred paths for each proxy pair comprises determining, for each of the proxy pairs denoted $(p_i, p_j)$, a list of one or more preferred paths.

3. The method of claim 2, wherein the determining, for each of the proxy pairs denoted $(p_i, p_j)$, a list of one or more preferred paths, comprises:

ordering the proxy pair links denoted $l_1, \ldots, l_m$ in nondecreasing order of RTT such that $d(l_1) \leq d(l_m)$, wherein $d(l_h)$ is the RTT of the proxy pair link $l_h$ for $h=1, \ldots, m$; and determining, for each of the proxy pairs denoted $(p_i, p_j)$, a list of one or more preferred paths.

4. The method of claim 3, wherein the determining, for each of the proxy pairs denoted $(p_i, p_j)$, a list of one or more preferred paths comprises, for each iteration of $h=1, \ldots, m$, determining, if any, a shortest path $L_{i,j,h}$ between proxies $p_i$ and $p_j$ excluding all links $l_{h+1}, \ldots, l_m$.

5. The method of claim 4, wherein the determining, for each of the proxy pairs denoted $(p_i, p_j)$, a list of one or more preferred paths further comprises adding, at the end of each iteration $h=1, \ldots, m$, the shortest path $L_{i,j,h}$ to the list of one or more preferred paths if such a shortest path $L_{i,j,h}$ exists and if a path length $D(i,j,h)$ of such a shortest path $L_{i,j,h}$ is shorter than a path length $D(i,j,h-1)$ of a shortest path $L_{i,j,h-1}$ between proxies $p_i$ and $p_j$ excluding all links $l_h, \ldots, l_m$.

6. The method of claim 5, wherein the determining, if any, a shortest path $L_{i,j,h}$ between proxies $p_i$ and $p_j$ excluding all links $l_{h+1}, \ldots, l_m$ comprises:

comparing a shortest path $L_{i,b,h-1}$ between proxies $p_i$ and $p_b$ excluding all links $l_h, \ldots, l_m$ with a shortest path $L_{i,a,h-1}$ between proxies $p_i$ and $p_a$ excluding all links $l_h, \ldots, l_m$ concatenated with the link $l_h$, wherein the link $l_h$ connects proxies $p_a$ and $p_b$; and comparing a shortest path $L_{i,a,h-1}$ between proxies $p_i$ and $p_a$ excluding all links $l_h, \ldots, l_m$ with a shortest path $L_{i,b,h-1}$ between proxies $p_i$ and $p_a$ excluding all links $l_h, \ldots, l_m$ concatenated with the link $l_h$, wherein the link $l_h$ connects proxies $p_a$ and $p_b$.

7. The method of claim 6 further comprising:

if a path length $D(i,a,h-1)$ of the shortest path $L_{i,a,h-1}$ plus a path length $d(l_h)$ of the link $l_h$ is shorter than a path length $D(i,b,h-1)$ of the shortest path $L_{i,b,h-1}$, determining that the shortest path $L_{i,b,h}$ includes the link $l_h$ and creating a pointer to i in a list $a \rightarrow b$; and if a path length $D(i,b,h-1)$ of the shortest path $L_{i,b,h-1}$ plus a path length $d(l_h)$ of the link $l_h$ is shorter than a path length $D(i,a,h-1)$ of the shortest path $L_{i,a,h-1}$, determining that the shortest path $L_{i,b,h}$ includes the link $l_h$ and creating a pointer to i in a list $b \rightarrow a$.

8. The method of claim 7, further comprising:

for each proxy pair $(p_i, p_j)$ with i in the list $a \rightarrow b$ and j in the list $b \rightarrow a$, comparing a path length $D(i,j,h-1)$ of the shortest path $L_{i,j,h-1}$ between proxies $p_i$ and $p_j$ excluding all links $l_h, \ldots, l_m$ with a path length path length $D(i,a,h-1)+d(l_h)+D(b,j,h-1)$ of the shortest path $L_{i,a,h-1}$ between proxies $p_i$ and $p_a$ excluding all links $l_h, \ldots, l_m$ concatenated with the link $l_h$ connecting proxies $p_a$ and $p_b$ concatenated with the shortest path $L_{b,j,h-1}$ between proxies $p_b$ and $p_j$ excluding all links $l_h, \ldots, l_m$; and if the path length path length $D(i,a,h-1)+d(l_h)+D(b,j,h-1)$ is less than the path length $D(i,j,h-1)$, adding $L_{i,a,h-1}$ concatenated with $l_h$ concatenated with $L_{b,j,h-1}$ to the list of one or more preferred paths as $L_{i,j,h}$.

9. The method of claim 1, wherein transport control protocol (TCP) is used for transmitting the data belonging to the data flow over the transport network.

10. Non-transitory computer readable media having stored thereon instructions for transmitting, over a transport network, data belonging to a data flow, the instructions comprising instructions for:

creating a proxy network including a plurality of transport network proxies;

defining a plurality of proxy pairs, each proxy pair including two of the plurality of transport network proxies;

defining a plurality of proxy pair links, each of the plurality of proxy pair links connecting one proxy of a proxy pair to the other proxy of the proxy pair;

determining, for each proxy pair link, a round trip time (RTT) of the respective proxy pair link;

determining, using the determined RTTs of the plurality of proxy pair links, a list of one or more preferred paths for each proxy pair, each preferred path connecting, via one or more of the plurality of proxy pair links, one proxy of the respective proxy pair to the other proxy of the respective proxy pair; and transmitting, from an ingress proxy selected from the plurality of transport network proxies to an egress proxy selected from the plurality of the transport network proxies, the data belonging to the data flow over a proxy pair path selected from a list of preferred proxy pair paths for the proxy pair including the ingress proxy and the egress proxy, wherein each preferred path in the list of one or more preferred paths for a particular proxy pair includes a maximum link RTT and a total path RTT, wherein for each pair of preferred paths for a particular proxy pair, one preferred path of the respective pair of preferred paths has a greater maximum link RTT and a lesser total path RTT as compared to the other preferred path of the respective pair of preferred paths, and wherein the proxy pair path is selected from the list of preferred proxy paths for the proxy pair including the ingress proxy and the egress proxy based on a flow size of the data flow, the flow size being determined based on one or more of a content length field in an application layer header, statistics generated from past connections to a destination, and information regarding content sizes served by a destination.

11. A system for transmitting, over a transport network, data belonging to a data flow, the system comprising:
one or more processors configured to:
create a proxy network including a plurality of transport network proxies;
define a plurality of proxy pairs, each proxy pair including two of the plurality of transport network proxies;
define a plurality of proxy pair links, each of the plurality of proxy pair links connecting one proxy of a proxy pair to the other proxy of the proxy pair;
determine, for each proxy pair link, a round trip time (RTT) of the respective proxy pair link;
determine, using the determined RTTs of the plurality of proxy pair links, a list of one or more preferred paths for each proxy pair, each preferred path connecting, via one or more of the plurality of proxy pair links, one proxy of the respective proxy pair to the other proxy of the respective proxy pair; and
transmit, from an ingress proxy selected from the plurality of transport network proxies to an egress proxy selected from the plurality of the transport network proxies, the data belonging to the data flow over a proxy pair path selected from a list of preferred proxy pair paths for the proxy pair including the ingress proxy and the egress proxy,
wherein each preferred path in the list of one or more preferred paths for a particular proxy pair includes a maximum link RTT and a total path RTT,
wherein for each pair of preferred paths for a particular proxy pair, one preferred path of the respective pair of preferred paths has a greater maximum link RTT and a lesser total path RTT as compared to the other preferred path of the respective pair of preferred paths, and
wherein the proxy pair path is selected from the list of preferred proxy paths for the proxy pair including the ingress proxy and the egress proxy based on a flow size of the data flow, the flow size being determined based on one or more of a content length field in an application layer header, statistics generated from past connections to a destination, and information regarding content sizes served by a destination.

* * * * *